N. P. SPAYD.
STAVE JOINTING MACHINE.
APPLICATION FILED SEPT. 24, 1914.
1,228,351.
Patented May 29, 1917.
7 SHEETS—SHEET 1.
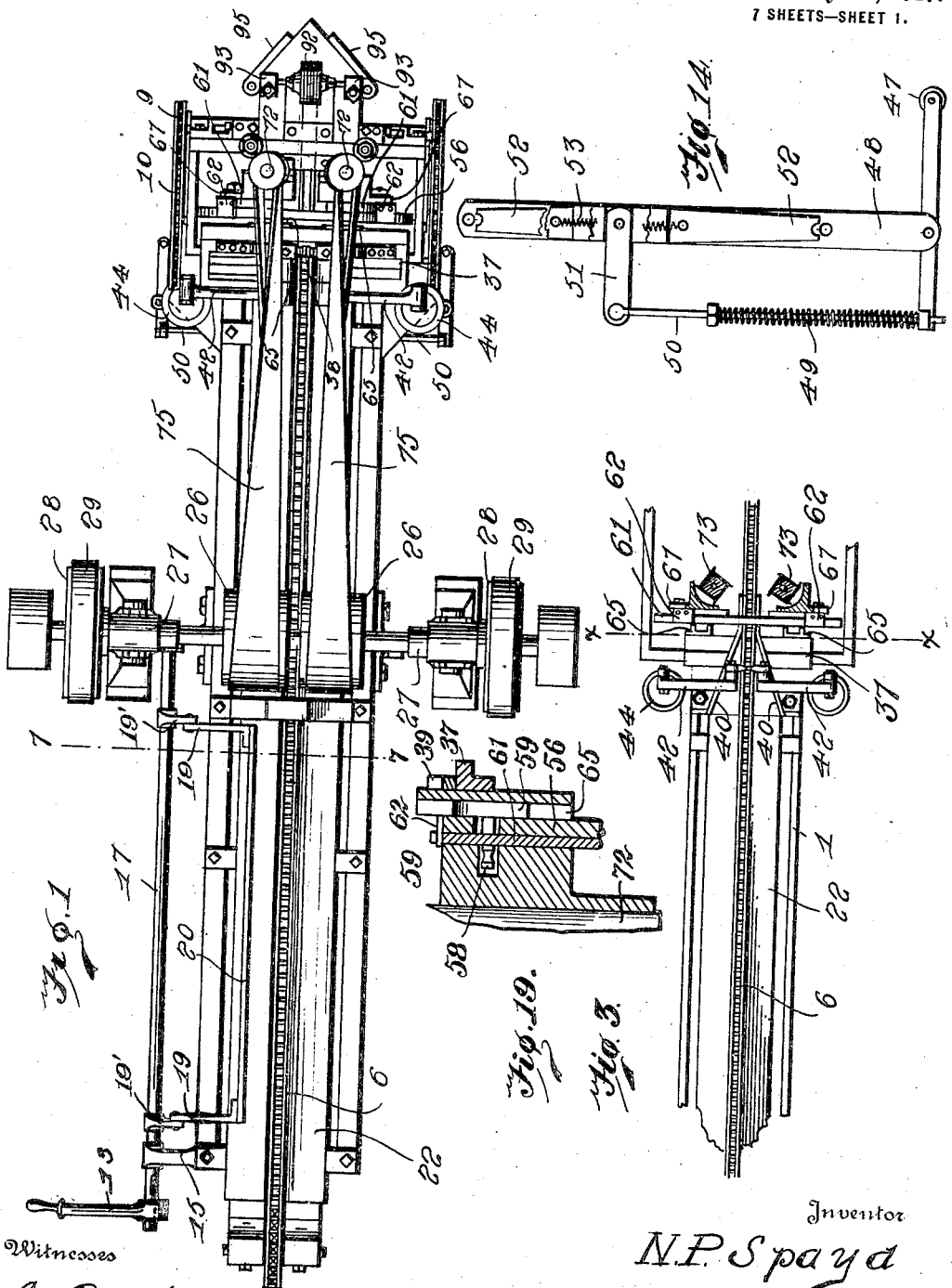
Inventor
N. P. Spayd

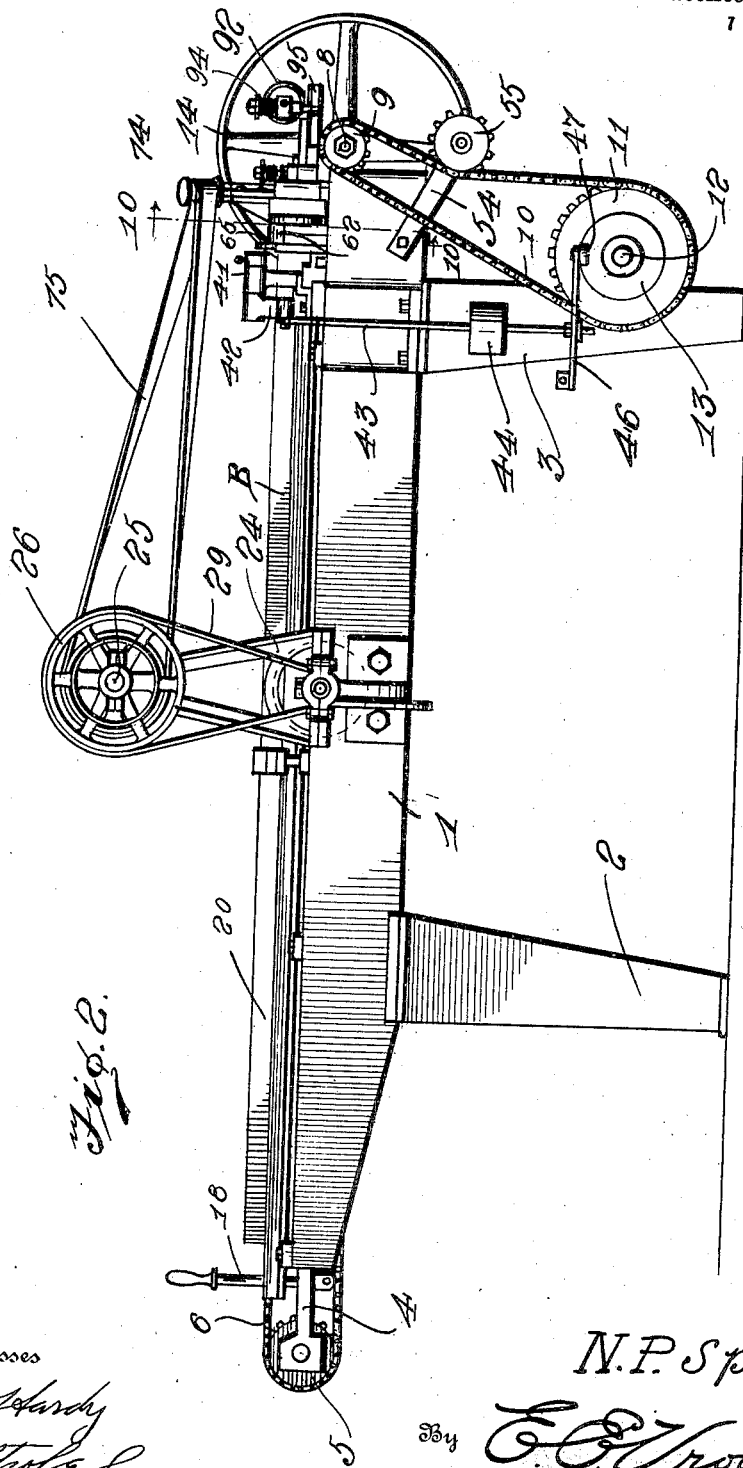

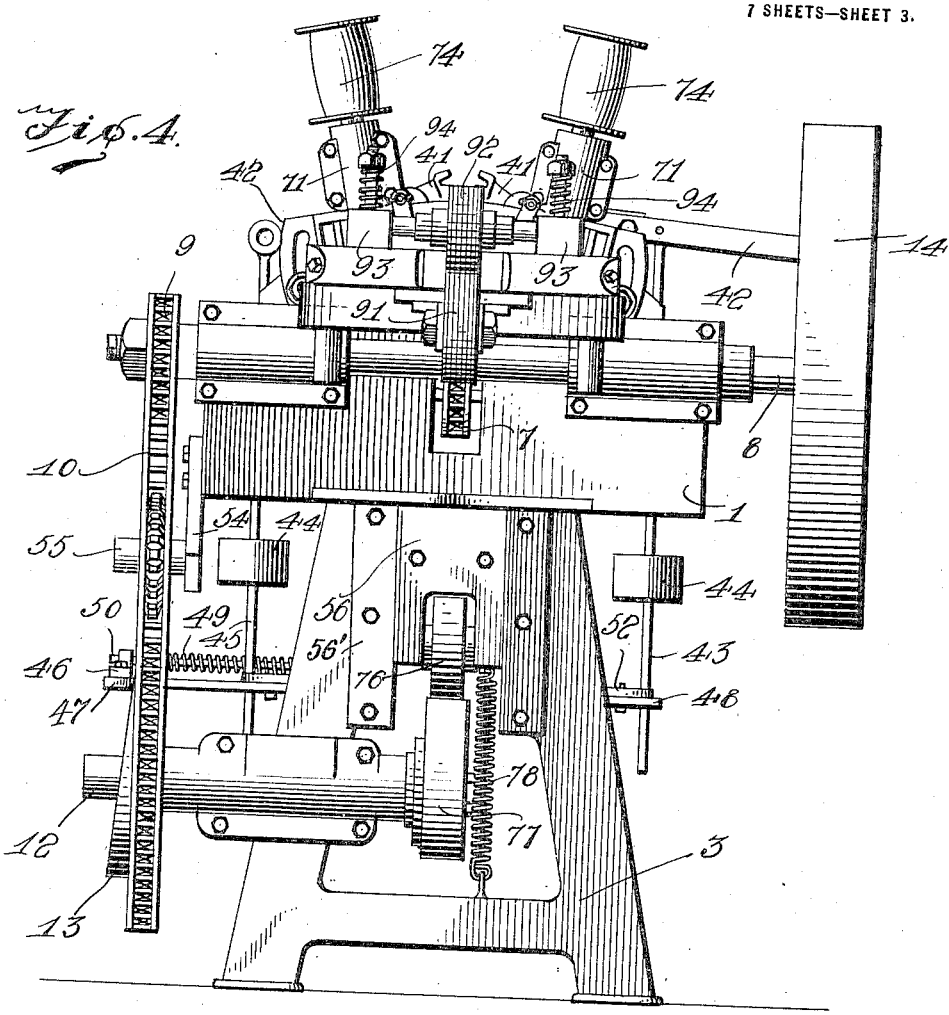

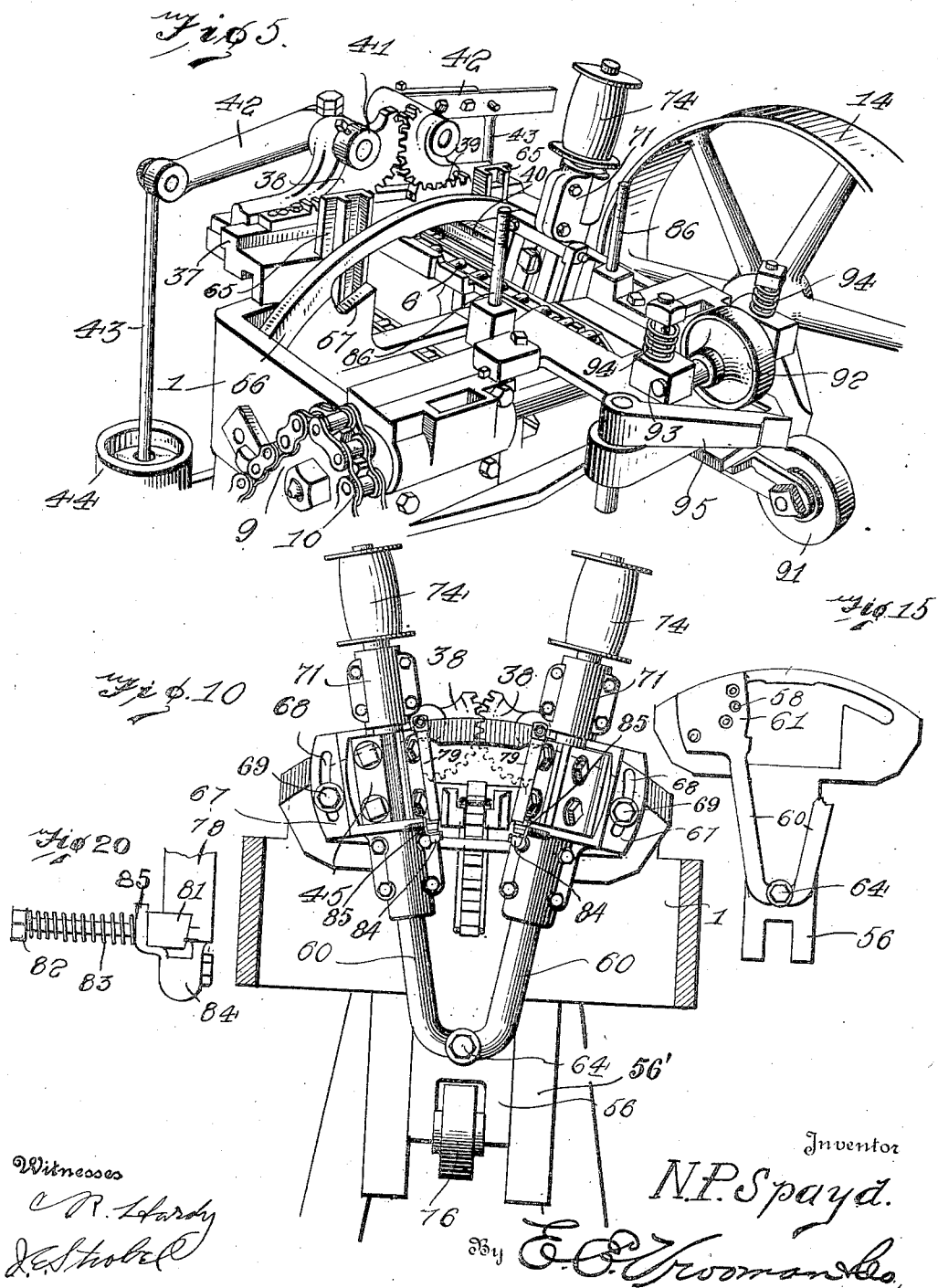

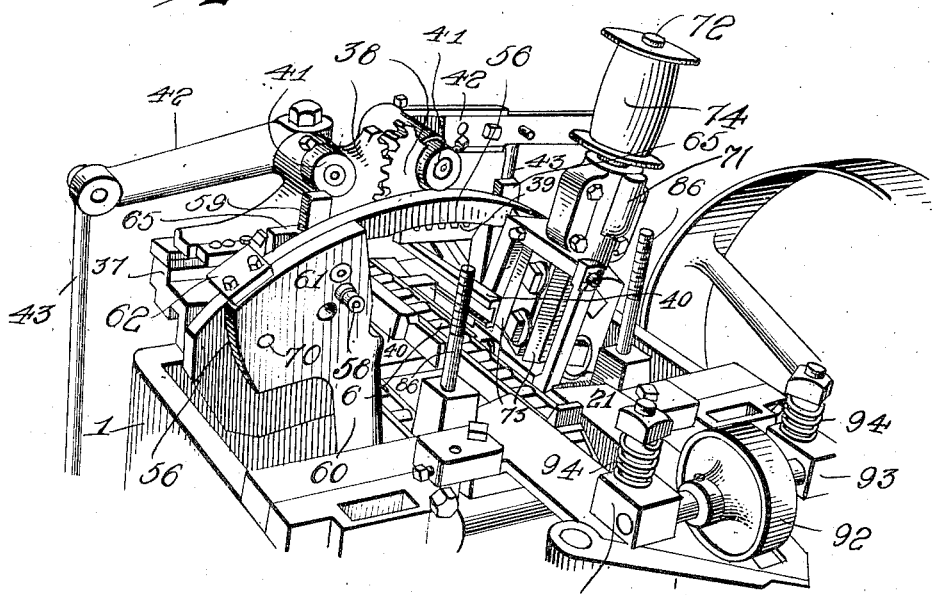

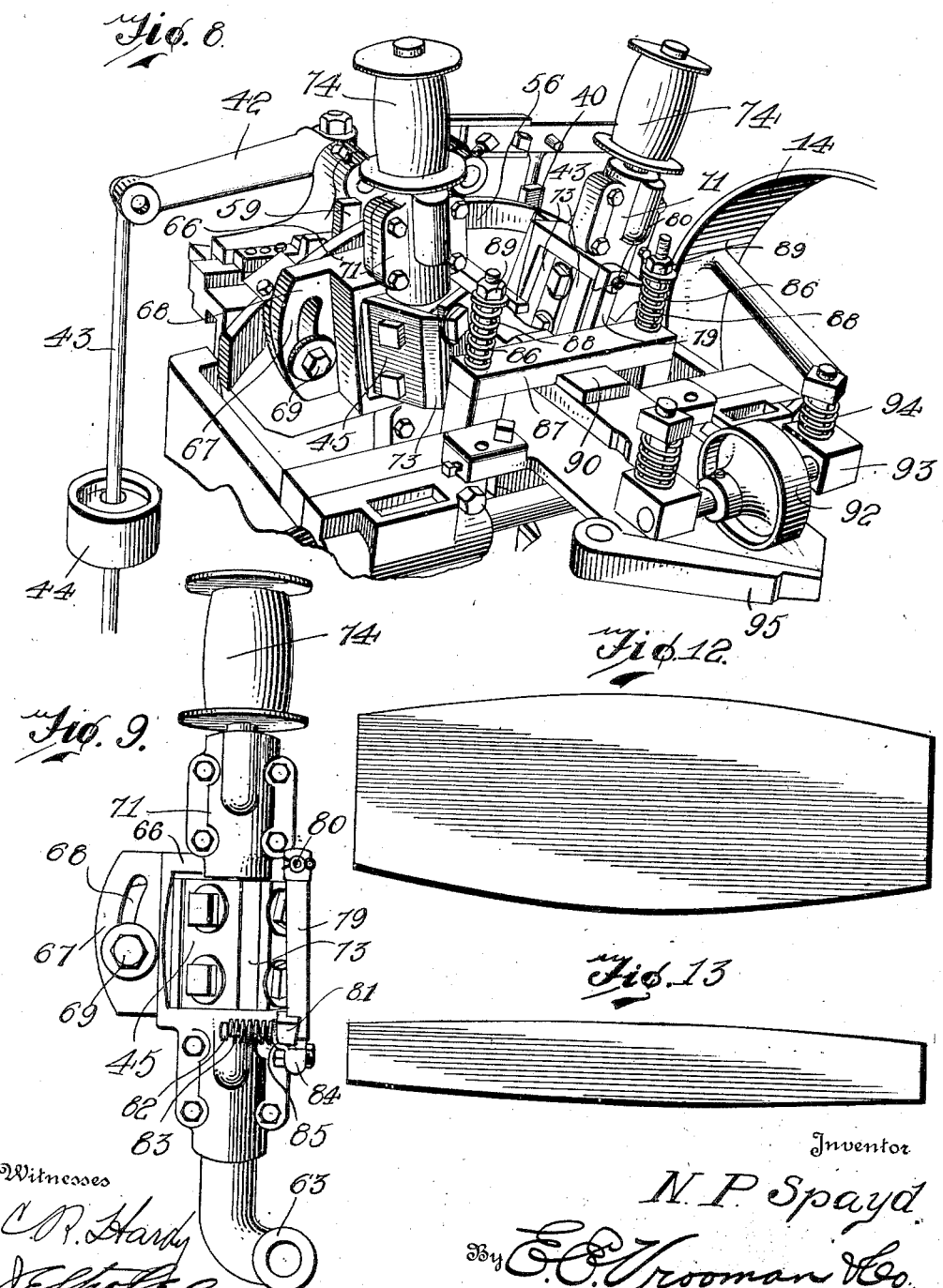

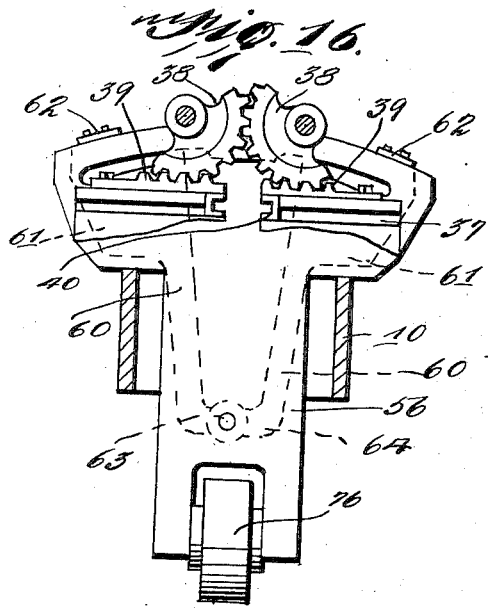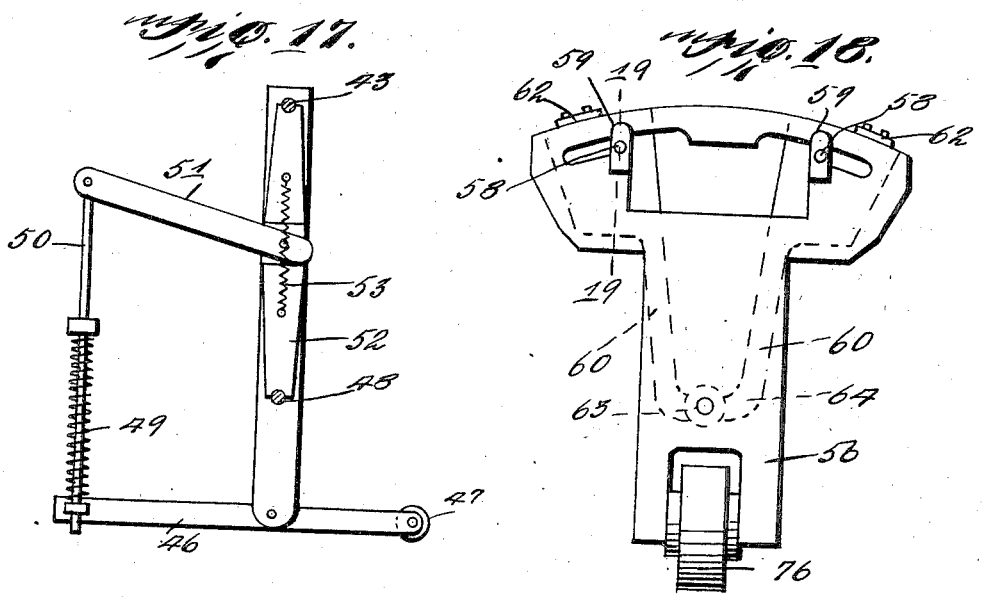

UNITED STATES PATENT OFFICE.

NOAH P. SPAYD, OF VAN WERT, OHIO, ASSIGNOR OF ONE-HALF TO EZRA C. SPAYD, OF VAN WERT, OHIO.

STAVE-JOINTING MACHINE.

1,228,351.                    Specification of Letters Patent.         Patented May 29, 1917.

Application filed September 24, 1914. Serial No. 863,340.

*To all whom it may concern:*

Be it known that I, NOAH P. SPAYD, a citizen of the United States of America, residing at Van Wert, in the county of Van Wert and State of Ohio, have invented certain new and useful Improvements in Stave-Jointing Machines, of which the following is a specification, reference being had therein to the accompanying drawing.
This invention relates to stave jointing machines and has for its object the production of a simple and efficient machine which will cut the sides of the stave on the desired arc and at the same time bevel the same in proportion with the width thereof in order to permit the staves to fit snugly together when once assembled.

Another object of this invention is the production of a simple and efficient mechanism for feeding the staves through the machine and holding the same in the proper position to be acted upon by the cutting mechanism.

With these and other objects in view this invention consists of certain novel combinations, constructions, and arrangements of parts as will be hereinafter fully described and claimed.

In the accompanying drawings:—
Figure 1 is a top plan view of the machine.

Fig. 2 is a side elevation thereof.

Fig. 3 is a top plan view of the body portion of the machine showing a portion thereof in cross-section.

Fig. 4 is a view of the outer discharge end of the machine.

Fig. 5 is a detail perspective view of a portion of the discharge end of the machine showing the arrangement of one of the cutting heads and the rack operating mechanism, the other cutting head and other portion of the machine being removed for the purpose of showing several parts thereof very clearly.

Fig. 6 is a perspective view of the machine similar to Fig. 5 showing several additional parts applied thereto which were eliminated from Fig. 5.
Fig. 7 is a section taken on line 7—7 of Fig. 1.

Fig. 8 is a perspective view of a portion of the discharge end of the machine, showing the entire portion thereof assembled.

Fig. 9 is a side elevation of one of the cutting members.

Fig. 10 is a transverse sectional view through the machine taken on line 10—10, of Fig. 2, the driving belts being removed therefrom and also the sprocket chains and wheels for the purpose of very clearly disclosing the important portions of the machine.

Fig. 11 is a transverse section showing the manner in which the staves fit after once being joined together.

Fig. 12 is a plan view of one of the wide staves showing the arc upon which the same is cut.

Fig. 13 is a plan view of one of the narrow staves showing the arc upon which the same is cut.

Fig. 14 is a plan view of the structure for actuating the locking mechanism for controlling the rack bars.

Fig. 15 is a front elevation of the supporting casting showing the cutter supporting arms mounted thereon, one of the arms being broken away.

Fig. 16 is a rear elevation of the supporting casting showing the reverse side to that shown in Fig. 15, showing the gears and guides carried thereby.

Fig. 17 is a top plan view of the means for locking the depending rods against movement.

Fig. 18 is a front elevation of the supporting casting showing the sliding shoes carried by the cutter supporting arms.

Fig. 19 is a sectional detail.

Fig. 20 is a detail of the stave holding device.

By referring to the drawings it will be seen that the present invention comprises a main frame 1 which is supported upon the forward legs 2 and the rear legs 3. The machine or frame 1 carries a plurality of projecting arms 4 which support a sprocket wheel 5 over which a conveyer chain 6 passes. The conveyer chain passes longitudinally of the machine and also passes over a sprocket wheel 7 carried by the discharge end of the machine. This sprocket wheel 7 is supported upon a driving shaft 8, which driving shaft 8 in turn carries a sprocket wheel 9, which sprocket wheel carries a chain 10 passing around a sprocket wheel 11 supported by a shaft 12. The sprocket wheel 11 carries a cam 13 for the purpose of actuating the locking mechanism to be hereinafter described. The shaft 8 supports a balance or fly-wheel 14 as is usual with such machines and as is clearly illustrated in Figs. 2 and 4. It, of course, should be understood that a driving belt may be placed over the pulley 14 for the purpose of driving the shaft 8.

The frame 1 supports a plurality of laterally projecting arms 15, which arms support a shaft 17, and this shaft 17 carries an operating lever 18. A plurality of arms 19 are supported upon the shaft 17 and engage a guiding plate 20 as is clearly illustrated in Fig. 1. It should be understood that by swinging the lever 18 and thereby rotating the shaft 17, the guiding plate 20 may be adjusted transversely across the body of the machine to suit the width of the stave which is placed upon the machine.

It should be understood that the conveyer chain 6 is provided with a plurality of lugs 21 for the purpose of engaging the end of a stave and moving the same longitudinally through the machine. It should be further understood that the staves are cut so as to have one straight surface and are then placed upon the table 22 of the machine and the conveyer chains 6 will cause the same to move longitudinally thereof. It should be understood, however, that the guide 20 may be adjusted transversely so as to allow the cutting saw, to be hereinafter described, to so cut the stave as to remove all of the inferior portion of the wood therefrom and only allow that portion of the stave to be used which is in good condition or suitable to be used as a barrel stave.

Attention is now directed especially to Fig. 7 which deals principally with the cutting saws to which reference has just been made. The frame 1 supports a plurality of upwardly extending standards 24, which standards carry a driving shaft 25 having two centrally arranged driving pulleys 26 keyed thereon for the purpose of driving the cutting members to be more fully hereinafter described. The standards 24 support the journal portions 27 at the respective ends of the shaft 25 and driving pulleys 28 are carried by the respective ends of the shaft 25 over which the driving belts 29 pass. These driving belts 29 also pass over pulleys 30 carried by the saw supporting shafts 31, which shafts 31 are mounted in the journals 32 clearly illustrated in Fig. 7. The saw supporting shafts 31 are keyed so as to have a slidable movement through their bearing portions 32, and each of the saw supporting shafts 31 carries a sleeve 33 and a cutting saw 34 which is clearly illustrated in Fig. 7. One of the saw supporting shafts 31 is engaged by means of a lever arm 35, which lever arm is supported upon the shaft 17. The lower end of the lever arm 35 is connected to an angle connecting link 36, which link is also connected to the opposite saw carrying shaft 31 and it will, therefore, be seen that as the shaft 17 is rotated through the actuation of the lever 18, the saws 34 will be drawn together for the purpose of acting upon the stave adapted to travel upon the table 22 above described.

After the stave has been cut by means of one of the saws 34, the same will be carried toward the discharge end of the machine and delivered into the funnel-shaped guides 37, thereby forcing the same laterally and causing the segmental gears 38 to rotate in view of the fact that the rack teeth 39 on the guides 37 mesh with the segmental gears 38 and are fixedly secured to the funnel-shaped guides 37, thereby admitting the forward end of the stave between the guides 37 for delivering the staves to the cutting member to be hereinafter described. These guides 37 are provided with projecting end portions 40, which projecting end portions constitute chip breakers for breaking off the chips from the edge of the staves prior to being delivered to the cutting knives to be hereinafter described. As stated above, the guides will be moved laterally as the stave is driven therebetween as the same are arranged to spread from two to six inches. It should be understood that these guides will move longitudinally an equal distance owing to the fact that the segmental gears 38 mesh with each other and will thereby cause an equal lateral movement of each of the guides.

The segmental gears 38 are supported by the stub shafts 41 and to these stub shafts are connected the levers 42 which extend upon opposite sides of the machine and are connected to the respective depending rods 43.

A weight 44 is carried by each of the depending rods 43 for the purpose of causing the levers 42 to be drawn downwardly as soon as the same are released. It should be understood that as soon as the stave passes within or between the guides 37 and just before the cutting heads 45 begin to operate upon the stave, the locking device which is specifically illustrated in Fig. 14 and as also illustrated in Figs. 2 and 4, will lock the guides in a set position. This locking device is operated by means of a cam 13 above referred to and which is carried by the shaft 12. This cam actuates a lever 46, which lever carries a roller 47 at its outer end. The lever 46 passes through a bar 48 and is pivotally secured thereto as is illustrated in Fig. 14. As the lever 46 is moved outwardly by means of the cam 13 the coil spring 49 carried by the rod 50 will be compressed, thereby causing the lever 51 to throw the bars 52 apart and cause the same to be brought into engagement with the depending rods 43 above described and as illustrated clearly in Figs. 4 and 5, as well as Fig. 14. These rods 43 pass through the supporting bar 48 as illustrated in Figs. 4 and 14. When, however, the roller 47 carried by the lever 46 runs off of the cam 13, the spring 53 will draw the bars 52 together and release the same from the depending rods 43. By reason of the weights 44 which are carried by the rods 43, the guides 37 will be drawn together until the rack teeth 39 are brought into close engagement and are rotated to receive the next stave. The bars 52 are slidably mounted on the bar 49 and as the lever 51 is swung, the bars 52 will be forced away from each other, for the reason that the inner end of the lever 51 acts as a cam.

As is illustrated in Fig. 2 a bracket 54 is suspended from the frame 1, and this bracket carries an idle sprocket wheel 55 for keeping a tension upon the sprocket chain 10. It should be understood that the sprocket wheel 11 is much larger than the sprocket wheel 9 so as to cause the sprocket wheel 9 to rotate several times to one rotation of the sprocket wheel 11.

A supporting casting 56 is carried by the frame 1 near the discharge end thereof, and this casting 56 is illustrated clearly in Fig. 15. The casting 56 is provided upon each side thereof with a pocket 57 through which the supporting pin 58 extends for engaging the sliding shoe 59 and connecting the shoe with the cutter supporting arm 60. The cutter supporting arm 60 is provided with an enlarged head portion 61 which carries an overhanging plate 62 for traveling upon the upper end of the casting 56, the upper edge of the casting constituting a track therefor. The lower end of the cutter supporting arm 60 is bent inwardly to produce a supporting eye 63 as is illustrated in detail in Fig. 9, and these eyes are pivotally secured to the casting 56 by means of a pivot bolt 64. The guides 37 carry a pair of channel portions 65, which channel portions extend vertically thereof and constitute tracks for the vertical sliding shoes 59, which are carried by the cutter head supporting arms 60. It will, therefore, be seen that as a stave passes between the guides 37 and spreads the same apart, the supporting arms 60 will be swung laterally upon their pivot supporting bolt 64 and change the relative angle of the cutter head 45. The casing 56 slides upon the tracks 56' which are bolted to the frame of the machine.

The cutter head 45 is supported by means of a plate 66 which is provided with a laterally extending flange 67 having an arc-shaped slot 68 formed therein through which an adjusting bolt 69 passes for anchoring the same to the head supporting arm 60, the bolt 69 passing through the apertures 70 illustrated in Fig. 6. The pin 58 fits in a socket formed in the head 66 for pivotally holding the same upon the arm 60. It should be understood that since the head 45 is pivoted on the pin 58, the cutting head 45 may be adjusted and held in the desired angle by means of the adjusting bolt 69, which works in the slot 68. The plate 66 carries a journal portion 71 through which the cutter head driving shaft 72 passes. A plurality of cutting blades 73 are carried by the cutter head and a driving pulley 74 is also carried thereby. Driving belts 75 pass around the pulleys 74 and also around the pulleys 26 which are carried by the shaft 25 for the purpose of imparting rotary movement to the pulleys 74 and consequently to the cutter head 45.

From the foregoing description it will be seen that as the guides 37 are widened by the staves entering between the same, these guides will carry the upper ends of the head supporting arms 60 radially, thereby changing the angle of the cutting heads and causing the same to bevel the edges of the stave upon the desired angle in proportion to the width of the stave which is passing through the machine. It will, therefore, be seen that the wider the stave, the greater the bevel that will be obtained, and thereby allow the different width staves to be properly beveled to produce a snug joint as is illustrated in Fig. 11. It should be understood that the securing bolts 69 will allow the proper adjustment of the plate 66 upon the head supporting arms 60 in order to set the machine for the desired cut provided any of the operating cams should be changed to accommodate the different size barrels or receptacles which are to be made from the staves.

The casting 56 carries a roller 76, which roller is adapted to engage the cam 77 carried by the shaft 12, and as the shaft 12 is rotated, it should be understood that the casting 56 is raised and lowered in accordance with the surface of the cam 77. A spring 78 is secured to the frame 1 and also engages the lower edge of the casting 56 to normally urge the downward movement upon the casting. The cam 77 is so arranged as to allow the cutter heads to be raised and lowered according to the longitudinal curvature of the stave which is necessary in order to accommodate the correct cutting of the stave along its edges wherein barrel staves and like articles are being cut or trimmed. Of course, it should be understood that the cam 77 is so arranged as to operate at the correct time with the hooks or lugs 21 formed upon the conveyer chain 6 in order to cause the casting 56 to be raised at the proper time to accommodate the cutting heads to the stave passing through the machine. It should be understood that the cam 77 is adapted to hold the casting 56 in its highest position when the end of the stave comes in contact with the cutting heads and to gradually lower the same as the stave passes toward the central portion and again raise the casting 56 as the stave reaches its opposite end and is being acted upon by the cutter heads. It should be further understood that the stave will be cut narrower at its end than in the middle and the added width in the middle of the stave, as well as the bevel of the edge, will be in proportion to the width of the stave, causing the stave to be of a perfect shape to fit the portion of the barrel which it is adapted to occupy. It should be further understood that the cam 77 is detachable and may be replaced by any suitable cam of the proper shape for any length of stave, as well as any amount of bulge which is desired to be used upon the stave.

The guides 65 are parallel as shown in Figs. 5, 6 and 10, and the arms 60 are connected to these guides and pivoted at 64. The movement of raising and lowering the cutter heads by the cam 77 is where the staves are shaped. The stave starts between the cutter heads while up, and is lowered by the shape of the cam 77 until the middle of the stave is reached. At this point the heads are at their lowest position. The heads are then carried up by the cam 77 until the other end of the stave is reached. When a stave starts between the cutter heads, they stand in a locked position and do not change their position relative to the center 64 until the stave is completed. The end of the barrel is of smaller diameter than the bilge or center of the barrel, and the cam 77 is so shaped to control the cutting heads to the amount of half the difference between the diameter at the end and the center of the barrel. It will be seen that the wider the stave, the greater will be the angle of the cutting knives relative to the center 64. The cam 77 raising the cutting heads at the same distance at all times will add width or bilge to the stave in proportion to the width of the stave. The bar B shown in Fig. 2 holds the stave down after it passes the cutter heads.

In order that the stave may be held from slipping after having passed the cutter head 45, a clamp has been provided which comprises an elongated strip 79 which is pivotally mounted upon a pin 80 as illustrated in Fig. 9. The lower end of the strip 79 works in an angle arm 81 carried by the body of the frame of the cutter head, and a bolt 82 passes therethrough and carries a coil spring 83 as is illustrated in Fig. 9. A head 84 is carried by the lower end of the strip 79 and is provided with an upwardly extending finger 85, which finger engages the coil spring 83 for normally urging the lower end of the strip 79 outwardly and constituting a yieldable support therefor. The strips 79 do not hold the stave in position until after they have passed the cutting heads. There is never at any time more to be taken from one side than the other by the cutting heads as the blanks are all sized by the saws 34 before entering these cutting heads. The staves are held rigid in position by the hopper-shaped guides 40 shown on Fig. 3.

It will, therefore, be seen that after the stave has passed the cutting head, the yieldably mounted strip 79 will hold the stave against lateral swinging movement and prevent the same from being twisted from the machine and being thrown out of alinement with the conveyer chain which is adapted to move the stave longitudinally of the body of the machine. The frame 1 of the machine is provided with a plurality of upwardly extending bolt portions 86 over which fits a pressure bar 87, which pressure bar is yieldably forced downwardly by means of the coil springs 88 carried by the upwardly extending bolts 86. Nuts 89 are threaded upon the upper ends of the bolts 86 for regulating the tension of the springs 88. A wooden shoe 90 is carried by the pressure bar 87 as is illustrated in Fig. 8 for firmly holding the stave upon the machine while passing under the pressure bar 87 and feeding the same to the rollers placed in advance of the pressure bar as will be hereinafter described. This pressure bar 87 holds the stave from slipping or moving while the cutter heads 45 are cutting the bevels, since a portion of the shoe 90 projects rearwardly between the cutter heads 45.

As is illustrated in Figs. 4 and 5, the body of the machine supports a primary idle roller 91 and a yieldably mounted idle roller 92. These idle rollers are adapted to prevent the stave from working sidewise until the same has passed the guides 79 carried by the cutting head supporting frames. It will be seen by carefully considering Fig. 5, that the yieldably mounted idle roller 92 is supported upon a plurality of journal blocks 93 which are forced downwardly by means of the coil springs 94 and thereby yieldably hold the idle roller 92 in yieldable engagement with the stave adapted to pass thereunder. A plurality of guiding arms 95 are employed upon the discharge end of the machine and are adapted to swing laterally to permit a stave to pass from the outer or forward end of the machine as will be clearly seen by carefully considering Fig. 5 of the drawings.

From the foregoing description it will be seen that a very simple and efficient mechanism has been produced for feeding the staves through the jointing machine and at the same time cutting, shaving and beveling the edges in order to cause the staves to fit snugly at their joining edges while forming a barrel or other suitable receptacle which is adapted to be constructed therefrom.

When placing a stave in the machine the same is placed upon the table 22 as above described and fed forwardly by means of the conveyer chain to the guiding members 37, whereupon the stave is forced through the guiding members, thereby adjusting the cutter heads to the desired pitch or angle and causing the edge of the stave to be properly cut or chamfered along the edge thereof. The stave will then be drawn forwardly and pass under the pressure bar 87 and shoe 90 and be discharged through the idle rollers 91 and 92, whereupon the stave is then ready to be placed in a barrel or other suitable receptacle.

In connection with the construction of the staves which are produced by means of the present device, particular attention is invited to Figs. 11, 12 and 13. Fig. 11 shows the manner in which the staves are joined together and connected for the purpose of forming a barrel or other cylindrical receptacle, illustrating clearly the manner in which the edges are chamfered in proportion to the width of the stave, thereby producing a snugly fitting joint. In Figs. 12 and 13 there is shown a plan view of different width staves showing the relatively different arcs upon which the side lines of the stave are formed.

Attention is particularly called to Fig. 17 and it will be seen that the rods 43 which are connected directly to the arms 42, have their lower ends passing through a bar 48. Clamping bars 52 are slidably mounted upon the bar 48 and these clamping bars 52 are provided with notched outer ends which notched outer ends are adapted to frictionally grip or surround a portion of the rods 43 and firmly clamp the rods 43 within the apertures formed in the bar 48. This clamping action is made possible through the medium of the arm 51 which is swung upon a pivot between the sliding bars 52. One end of the bar 51 constitutes a cam for forcing these bars 52 apart when the bar 51 is swung thereby firmly binding the bars 52 in engagement with the rods 43. As above described the bar 51 is swung through the medium of the arm 46 which arm 46 is actuated by means of the cam 13.

Having thus described the invention what is claimed as new, is:—

1. A stave jointing machine comprising a support, a plurality of laterally slidable guides carried thereby, cutting head supporting plates connected to said laterally slidable guides, cutting heads supported by said cutting head supporting plates, means for driving said cutting heads, rack bars carried by said guides, segmental gears carried by said rack bars and meshing together, arms secured to said segmental gears, depending rods secured to the outer ends of said arms, a guiding bar, said depending rods passing through said guiding bar, locking plates slidably mounted upon said guiding bars and having their ends adapted to engage said depending rods for firmly gripping the same and preventing vertical downward movement of said rods, and means for forcing said locking plates to a locked position.

2. A stave jointing machine comprising a support, a plurality of laterally slidable guides, cutting heads connected to said laterally slidable guides, rack bars carried by said guides, segmental gears engaging said rack bars and meshing together, arms secured to said segmental gears and projecting laterally of said support, depending rods pivotally secured to said arms, weights carried thereby, a supporting bar carried by said support, said rods passing through said supporting bar, and means slidably mounted upon said supporting bar and adapted to be firmly brought into engagement with said depending rods against movement through said supporting bar.

3. A stave jointing machine comprising a support, a plurality of laterally slidable guides carried thereby, cutting head supporting plates secured to said laterally slidable guides, means for pivotally securing said supporting plates at the lower face thereof, means carried by said supporting plates and guides for permitting the inward movement of said plates with respect to each other, cutter heads carried by said plates, controlling arms coöperating with said guides and capable of being swung as said guides are moved, depending rods connected to said arms, a supporting bar carried by said support and provided with apertures formed therein, said depending rods passing through said apertures, slidable locking plates carried by said supporting bar, yieldable means for normally holding said locking plates out of engagement with said depending rods, a cam lever pivoted between said locking plates and adapted to engage the ends of said locking plates for forcing said locking plates into biting engagement with said depending rods as said cam lever is swung for locking said depending rods against movement at pre-determined intervals.

4. A stave jointing machine comprising a support, a plurality of laterally slidable guides carried thereby, cutting head supporting plates secured to said laterally slidable guides, means for pivotally securing said supporting plates at the lower face thereof, means carried by said supporting plates and guides for permitting the inward movement of said plates with respect to each other, cutter heads carried by said plates, controlling arms coöperating with said guides and capable of being swung as said guides are moved depending rods connected to said arms, a supporting bar carried by said support and provided with apertures formed therein, said depending rods passing through said apertures, slidable locking plates carried by said supporting bar, yieldable means for normally holding said locking plates out of engagement with said depending rods, a cam lever pivoted between said locking plates and adapted to engage the ends of said locking plates for forcing said locking plates into biting engagement with said depending rods as said cam lever is swung for locking said depending rods against movement at pre-determined intervals, and means for swinging said cam lever at pre-determined intervals.

5. A stave jointing machine comprising a support, a plurality of laterally slidable guides carried thereby, cutting head supporting plates secured to said laterally slidable guides, means for pivotally securing said supporting plates at the lower face thereof, means carried by said supporting plates and guides for permitting the inward movement of said plates with respect to each other, cutter heads carried by said plates, controlling arms coöperating with said guides and capable of being swung as said guides are moved, depending rods connected to said arms, a supporting bar carried by said support and provided with apertures formed therein, said depending rods passing through said apertures, slidable locking plates carried by said supporting bar, yieldable means for normally holding said locking plates out of engagement with said depending rods, a cam lever pivoted between said locking plates and adapted to engage the ends of said locking plates for forcing said locking plates into biting engagement with said depending rods as said cam lever is swung for locking said depending rods against movement at pre-determined intervals, means for swinging said cam lever at pre-determined intervals, said means comprising a cam wheel, a pivotal arm engaging said cam wheel, and a yieldable connection formed between said cam lever and said pivoted mounted arm.

6. A stave jointing machine comprising a frame, a table, cutter head supporting plates carried by said frame, means for swinging said cutter head supporting plates toward each other at pre-determined intervals, cutter heads supported by said cutter supporting plates, means for driving said cutter heads, a clamp secured to said cutter head supporting plates and comprising an elongated strip, a guiding clip engaging the lower end of said elongated strip, and means for yieldably urging the lower end of said strip outwardly for constituting a yieldable support for the lower end of said strip and being adapted to yieldably hold a stave against slipping after the same has passed by the cutter head.

In testimony whereof I hereunto affix my signature in presence of two witnesses.

NOAH P. SPAYD.

Witnesses:
 CLEM V. HOKE,
 JENNIE WILKINSON.